United States Patent [19]

Sarkkinen et al.

[11] Patent Number: 5,436,984
[45] Date of Patent: Jul. 25, 1995

[54] MINIMUM DELAY DILATION/EROSION FILTER

[75] Inventors: Timo Sarkkinen, Kempele; Timo Piironen; Kari Tiensyrajä, both of Oulu, all of Finland

[73] Assignee: Rautaruukki Oy, Oulu, Finland

[21] Appl. No.: 137,158

[22] PCT Filed: May 8, 1992

[86] PCT No.: PCT/FI92/00147

§ 371 Date: Oct. 26, 1993

§ 102(e) Date: Oct. 26, 1993

[87] PCT Pub. No.: WO92/21093

PCT Pub. Date: Nov. 26, 1992

[30] Foreign Application Priority Data

May 14, 1991 [FI] Finland .................. 912343

[51] Int. Cl.$^6$ .............................. G06K 9/44
[52] U.S. Cl. ...................... 382/258; 382/302
[58] Field of Search .............. 382/54, 27, 41, 49, 382/50, 53, 55

[56] References Cited

U.S. PATENT DOCUMENTS

| | | | |
|---|---|---|---|
| 4,641,356 | 2/1987 | Steinberg | 382/49 |
| 4,692,943 | 9/1987 | Pietzsch et al. | 382/8 |
| 4,724,543 | 2/1988 | Klevecz et al. | 382/6 |
| 4,760,607 | 7/1988 | Steinberg et al. | 382/49 |
| 4,809,348 | 9/1989 | Meyer et al. | 382/49 |
| 4,980,923 | 12/1990 | Kawamoto et al. | 382/41 |

FOREIGN PATENT DOCUMENTS 132134  4/1985  European Pat. Off. ....... G06K 9/44

OTHER PUBLICATIONS

Loui et al, "High-Speed Architectures for Morphological Image Processing", Nonlinear Image Processing, pp. 145–156, 1990.

Sternberg, Stanley R., IEEE Computer, Biomemdical Image Processing, CytoSystems Corporation, 1983.

*Primary Examiner*—Leo H. Boudreau
*Assistant Examiner*—D. Richard Anderson
*Attorney, Agent, or Firm*—Sughrue, Mion, Zinn, Macpeak & Seas

[57] ABSTRACT

A filter for performing dilation and/or erosion operations associated with mathematical morphology using a $W \times H$ rectangular structuring element to a two-dimensional matrix of discrete values, the width of the matrix being x and the height being y, includes a horizontal portion for applying the selected operation to a $W \times 1$ local neighbourhood and a vertical portion for applying the selected operation to a $1 \times H$ local neighbourhood. According to one aspect of the filer, the portions are connected one after the other and the matrix elements are applied serially to the first portion, the output of one portion being connected to the input of the other portion. Each of the above-mentioned portions includes a multiplicity of delay devices, each device providing an equal delay, and a multiplicity of comparing devices for comparing two input values. Each comparing device can produce a selected one of the lesser or greater of the input values at their output so as to permit erosion and dilation operations, respectively. According to another aspect of the invention, each portion includes a set of identical operator elements connected one after another, the horizontal portion having W such operator elements while the vertical portion having H such operator elements.

4 Claims, 1 Drawing Sheet

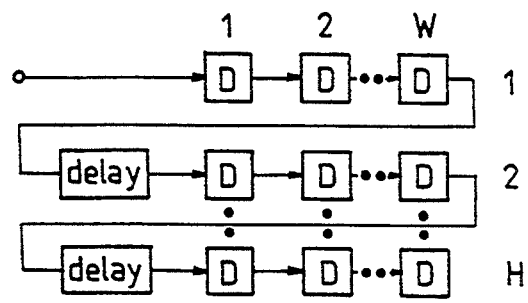
FIG. 1 PRIOR ART
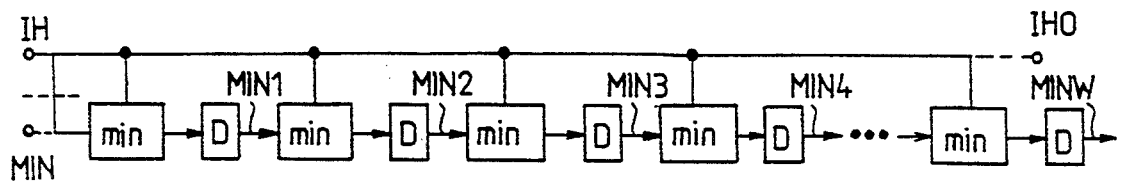
FIG. 2
FIG. 3
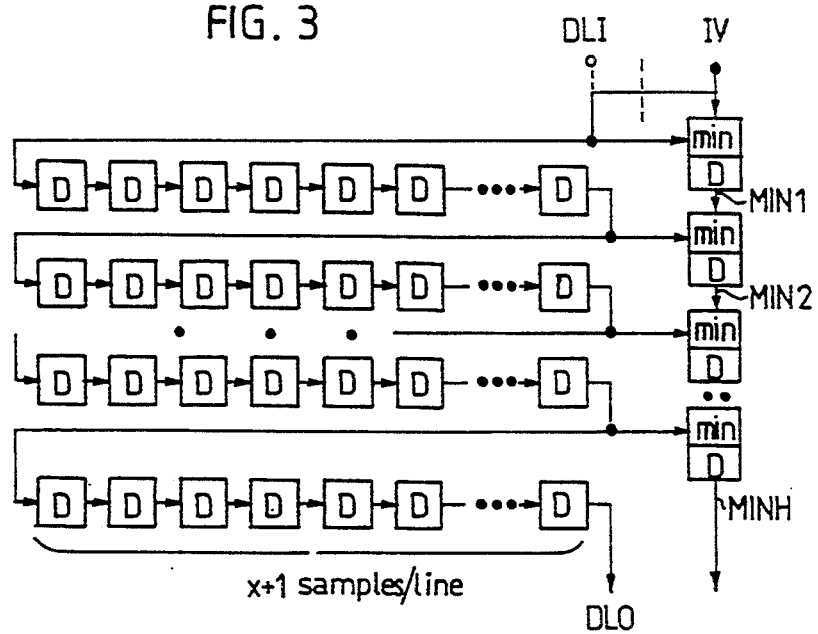

MINIMUM DELAY DILATION/EROSION FILTER

BACKGROUND OF THE INVENTION

1. Field of the Invention

The present invention relates to a filter for applying dilation and/or erosion operations of mathematical morphology using a W×H rectangular structuring element to a two-dimensional matrix of discrete values, the width of the matrix being x and the height being y, the filter comprising a horizontal portion for applying said dilation or erosion operation to a W×1 local neighbourhood and a vertical portion for applying said dilation or erosion operation to a 1×H local neighbourhood, whereby the portions are connected one after the other and the matrix elements are applied serially to the first portion, the output of one portion being connected to the input of the other portion, wherein the portions comprise a multiplicity of delay means, each providing an equal delay, and a multiplicity of comparing means for comparing two input values and producing the lesser or greater of these values at their output, in the cases of erosion and dilation respectively, wherein each portion comprises a set of identical operator elements connected one after another, the horizontal portion comprising W such operator elements, and the vertical portion comprising H such operator elements.

2. Description of Related Art

Mathematical morphology is a formal method of shape representation and analysis. Basic operations thereof are erosion and dilation, by chaining of which in a suitable manner it is possible to provide, e.g., effective and usable image processing methods. For instance, many applications of computer vision, such as pattern recognition, are based on the use of morphological operators.

In mathematical morphology, the basic operations process the image by means of so-called structuring elements. A structuring element is a neighbourhood in which an operator is effective. In gray-scale morphology, dilation stands for the maximum of the local neighbourhood defined by the structuring element and erosion stands for the minimum, respectively.

Basic data to be processed has been arranged in the form of a matrix, in which each line comprises x samples and the total number of lines is y. In the following example, the dilation and erosion operations for basic data of the size of x=6 and y=6 are examined. The local neighbourhood is rectangular with the dimensions W=3 and H=3, where W is a horizontal and H a vertical dimension.

TABLE 1

Erosion and dilation operations performed on basic data in neighbourhood 3*3

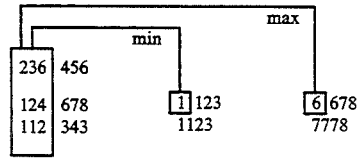

TABLE 1-continued

Erosion and dilation operations performed on basic data in neighbourhood 3*3

```
765 |767|       1123
137 |777|       135|1|      7777
                              777|7|
            min          max
555 |551|
```

Basic data    Erosion performed on basic data    Dilation performed on basic data Traditionally, operators are realized by means of the structure of FIG. 1. It comprises delay means D connected one after another to form horizontal lines, each line comprising W delay means, which lines, H in number, are chained one after another in such a way that between each horizontal line is connected a delay line, the length of which is X−W) times the delay of one delay means D. In this structure, a processing means has to be connected to each delay means D of each horizontal line, whereby the processing means has to compare W×H values with each other to find the minimum/maximum value desired. Thus the processing means will be quite complicated and therefore also slow. An image processing unit realized in this manner in principle is disclosed, e.g., by U.S. patent specification No. 4,692,943.

A filter defined in the opening paragraph can be formed on the basis of information given in NONLINEAR IMAGE PROCESSING, vol. 1247, 15 Feb 1990, Santa Clara, Calif., pages 145–156; A.C.P. LOUI et al.: "High-speed architectures for morphological image processing". This reference shows a serial combination of a number of identical elements to form dilation and/or erosion processors and gives the teaching that a two-dimensional dilation/erosion operation can be accomplished by coupling serially a horizontal and a vertical portion. The elements used for the dilation and/or erosion processors include, however, several components and the serial combinations formed thereby are slow in operation.

SUMMARY OF THE INVENTION

To solve the problems attached to the prior art filter structures and caused especially by difficulty of extension, complexity of structure and consequent slow operation, the filter of the invention is characterized by each of said operator elements consisting of one comparing means and one delay means, the output of the comparing means being connected to the input of the delay means, the output of the delay means of a preceding operator element being connected to the first input of the comparing means of the following operator element, the input of the horizontal portion being connected to the first input of the comparing means of the first operator element and also to the second input of the comparing means of each operator element in the the horizontal portion, the output of the Wth operator element forming the output of the horizontal portion, the said vertical portion further comprising H delay lines each comprising X+1 further delay means connected one after another, the input of the vertical portion being connected to both first and second inputs of the comparing means of the first operator element of the vertical portion and also to the input of the first of the delay lines, the output of each delay line being connected both to the second input of the comparing means of the following operator element and to the input of the following delay line, and the output of the Hth operator element forming the output of the vertical portion.

In this filter structure of the invention, basic data x*y is processed by a dilation or erosion operation in a local neighbourhood W*H, which is made to slide over the basic data x*y. According to the method, the operations of dilation and erosion are performed in such a way that the maximum (dilation) or the minimum (erosion) is at first searched for in a local neighbourhood W*1 (horizontal portion). In the result obtained in this way, the maximum (dilation) or the minimum (erosion) is then searched for in a local neighbourhood 1*H (vertical portion). The performing order of the horizontal and vertical portions can also be reverse.

To visualize the function of the filter, the function of a horizontal operator performing the minimum operation (erosion) is examined by way of example. The function is depicted in Table 2. The uppermost horizontal line represents an incoming data stream delayed by one clock period (=MIN1) in which stream the minimum is searched for in a neighbourhood, (5*1 in this case). Each line represents the minimum value of a certain neighbourhood, which value can be calculated in the manner presented in the table. The arrows show from which values the minimum value is generated each time. The columns against show the situation at a certain moment. The table presents the operations required for the calculation of three successive minimum values.

TABLE 2

Operating principle of a horizontal minimum (erosion) filter operating in neighbourhood 5*1.

| | t | t+1 | t+3 | | t+5 | t+7 | t+9 | t+11 | t+13 | t+14 | t+16 |
|---|---|---|---|---|---|---|---|---|---|---|---|
| MIN1 | 5 | 2 | 10 | 8 | 30 | 20 | 5 8 | 1 4 | 2 2 | 6 8 | 10 10 | 10 10 |
| MIN2 | | 2 | 2 | 8 | 8 | 20 | 5 5 | 1 1 | 2 2 | 2 6 | 8 10 | 10 10 |
| MIN3 | | | 2 | 2 | 8 | 8 | 5 5 | 1 1 | 1 2 | 2 2 | 6 8 | 10 10 |
| MIN4 | | | | 2 | 2 | 8 | 5 5 | 1 1 | 1 1 | 2 2 | 2 6 | 8 10 |
| MIN5 | | | | | 2 | 2 | 5 5 | 1 1 | 1 1 | 1 2 | 2 2 | 6 8 |
| MIN1 | 5 | 2 | 10 | 8 | 30 | 20 | 5 8 | 1 4 | 2 2 | 6 8 | 10 10 | 10 10 |
| MIN2 | | 2 | 2 | 8 | 8 | 20 | 5 5 | 1 1 | 2 2 | 2 6 | 8 10 | 10 10 |
| MIN3 | | | 2 | 2 | 8 | 8 | 5 5 | 1 1 | 1 2 | 2 2 | 6 8 | 10 10 |
| MIN4 | | | | 2 | 2 | 8 | 5 5 | 1 1 | 1 1 | 2 2 | 2 6 | 8 10 |
| MIN5 | | | | | 2 | 2 | 5 5 | 1 1 | 1 1 | 1 2 | 2 2 | 6 8 |
| MIN1 | 5 | 2 | 10 | 8 | 30 | 20 | 5 8 | 1 4 | 2 2 | 6 8 | 10 10 | 10 10 |
| MIN2 | | 2 | 2 | 8 | 8 | 20 | 5 5 | 1 1 | 2 2 | 2 6 | 8 10 | 10 10 |
| MIN3 | | | 2 | 2 | 8 | 8 | 5 5 | 1 1 | 1 2 | 2 2 | 6 8 | 10 10 |
| MIN4 | | | | 2 | 2 | 8 | 5 5 | 1 1 | 1 1 | 2 2 | 2 6 | 8 10 |
| MIN5 | | | | | 2 | 2 | 5 5 | 1 1 | 1 1 | 1 2 | 2 2 | 6 8 |

In the method, the minimum is searched for in successive samples n, n+1, n+2, n+3, ..., n+(W−1).

Sample n (=minimum in neighbourhood 1*1=MIN1=MIN{n}) is received by the input of the horizontal portion at a moment t, sample n+1 at a moment t+1 etc. During t+1 the minimum is calculated from the samples n and n+1 and the result is the minimum in neighbourhood 2+1, i.e. MIN2 (=min{MIN1,n+1}=min{n,n+1}). During t+2 the minimum is calculated from the samples n+2 and MIN2 and the result is the minimum in neighbourhood 3*1, i.e. MIN3 (=min{MIN2,n+2}=min{n,n+1,n+2}). Correspondingly, during t+3 the minimum is calculated from the samples n+3 and MIN3 and the result is the minimum in neighbourhood 4*1, i.e. MIN4 (=min{MIN3, n+3}=min{n,n+1,n+2,n+3}). By continued analysis the minimum is reached in dimension W*1, where W is the horizontal dimension of the neighbourhood (W=5 in the sample above).

Because at the moment t0 the minimum operations $MIN1(t0) = \min\{n + t0\}$
$MIN2(t0) = \min\{MIN1(t0 - 1), n + t0\}$
$MIN3(t0) = \min\{MIN2(t0 - 1), n + t0\}$
$MIN4(t0) = \min\{MIN3(t0 - 1), n + t0\}$ -continued $$\text{MIN}W(t0) = \min\{\text{MIN}(W-1)(t0-1), n+t0\}$$

can be performed in parallel (n+t0=sample at the moment t0), the operations can be performed by means of the horizontal portion, comprising W operator elements connected one after another, each of which operator elements consists of one comparing means and one delay means, the output of the delay means of a preceding operator element being connected to the first input of the comparing means of the following operator element and the input of the horizontal portion being connected to the first input of the comparing means of the first operator element and also to the second input of the comparing means of each operator element, whereby the output of the Wth operator element forms the output of the horizontal portion. The operations can thus be performed in real time in such a way that the minimum in the local neighbourhood W*1 is obtained at the end of the chain in each clock period. Operations to be performed at the moment t0 are depicted in Table 3.

TABLE 3

Operations to be performed at the moment t0

|  | t0 − 1 | t0 | t0 + 1 |  |  |  |  |  |  |  |  |  |  |
|---|---|---|---|---|---|---|---|---|---|---|---|---|---|
|  |  |  | 20 |  |  |  |  |  |  |  |  |  |  |
| MIN1 | 5 2 10 8 30 | 20 | 5 8 1 4 2 2 6 8 10 10 10 10 |
| MIN2 | 2 2 8 8 | 20 | 5 5 1 1 2 2 2 6 8 10 10 10 |
| MIN3 | 2 2 8 | 8 | 5 5 1 1 1 2 2 2 6 8 10 10 |
| MIN4 | 2 2 | 8 | 5 5 1 1 1 1 2 2 2 6 8 10 |
| MIN5 | 2 2 | | 5 5 1 1 1 1 1 2 2 2 6 8 |

On the other hand, the vertical operation can be performed by means of the vertical portion, comprising H operator elements connected one after another, the output of the delay means of a preceding operator element being connected to the first input of the comparing means of the following operator element, whereby the output of the Hth operator element forms the output of the vertical portion, and H delay lines with x+1 delay means connected one after another, the input of the vertical portion being connected both to the first and the second input of the comparing means of the first operator element and also to the input of the first delay line and the output of each delay line being connected both to the second input of the comparing means of the following operator element and to the input of the following delay line.

The function of the vertical portion is visualized in Table 4. The uppermost horizontal line shows the incoming data stream (from the horizontal portion) delayed by one clock period (=MIN1). In this table, the minimum (erosion) in neighbourhood 1*5 is searched for. Each line presents the minimum in a certain neighbourhood, which can be calculated in the manner shown in the table. The arrows show the route of the data stream leading to the calculation of the first neighbourhood 1*5.

TABLE 4

Operating principle of a vertical minimum (erosion) filter operating in neighbourhood 1*5 a) data to be processed

Reference vector at moment t0 in table 5

| 5 | 8 | 1 | 6 | 2 | 4 | 5 | 8 | 7 | 1 | 6 | 8 | 5 | 3 | 2 | 1 | 1 | 3 | 2 |
| 4 | 5 | 2 | 8 | 1 | 7 | 6 | 2 | 8 | 1 | 6 | 1 | 1 | 7 | 4 | 2 | 1 | 6 | 5 |
| 2 | 2 | 1 | 1 | 5 | 5 | 5 | 8 | 8 | 6 | 3 | 2 | 2 | 4 | 5 | 7 | 3 | 3 | 3 |
| 7 | 6 | 2 | 8 | 3 | 5 | 4 | 3 | 2 | 1 | 5 | 8 | 1 | 6 | 3 | 3 | 3 | 3 | 8 |
| 1 | 5 | 8 | 1 | 7 | 7 | 7 | 3 | 2 | 7 | 4 | 2 | 8 | 5 | 3 | 9 | 6 | 2 | 5 |

Reference vector in table 4 b)

b) processed data

|  | 5 | 4 | 2 | 7 | 1 |  |  |  |  |  |  |  |  |  |  |
|---|---|---|---|---|---|---|---|---|---|---|---|---|---|---|---|
| MIN1 | 5 | 8 | 1 | 6 | 2 | 4 5 8 7 1 6 8 5 3 2 1 1 3 2 |
| MIN2 |  | 4 | 5 | 1 | 6 | 1 4 5 2 7 1 6 1 1 3 2 1 1 3 2 |
| MIN3 |  |  | 2 | 2 | 1 | 1 1 4 5 2 7 1 3 1 1 3 2 1 1 3 2 |
| MIN4 |  |  | 2 | 2 |  | 1 1 1 4 4 2 2 1 3 1 1 3 2 1 1 3 2 |
| MIN5 |  |  |  | 1 |  | 2 1 1 1 4 4 2 2 1 3 1 1 3 2 1 1 2 2 |

In the method, the minimum is searched for in the samples, n, n+x, n+2x, n+3x, ..., n+(H−1)x to be obtained from the horizontal portion, where H is the vertical dimension of the nieghbourhood (H=5 is example above) and x is the line length of the data to be processed.

Sample n is received by the input of the vertical portion (=minimum in neighbourhood 1*1=MIN1-=min{n}) at the moment t, sample n+x at the moment t+1 etc. During t+1 the minimum is calculated from the samples n and n+x and the result is the minimum in neighbourhood 1*2, i.e. MIN2 (=min{MIN1,n+x-}=min{n,n+x}). During t+2 the minimum is calculated from the samples n+2x and MIN2 and the result is the minimum in neighbourhood 1*3, i.e., MIN3 (=min{MIN2, n+2x}=min{n,n+x,n+2x}). By contained analysis the minimum is reached in neighbourhood 1*H.

Because at the moment t0 the minimum operations $$\text{MIN1}(t0) = \min\{n + t0\}$$
$$\text{MIN2}(t0) = \min\{\text{MIN1}(t0 - 1), n + t0 + x - 1\}$$
$$\text{MIN3}(t0) = \min\{\text{MIN2}(t0 - 1), n + t0 + 2(x - 1)\}$$

-continued $$MIN4(t0) = \min\{MIN3(t0 - 1), n + t0 + 3(x - 1)\}$$
$$\ldots$$
$$MINH(t0) = \min\{MINH - 1(t0 - 1), n + t0 + (H - 1)(x - 1)\}$$

can be performed in parallel (n+t0=sample at the moment t0), the operations can be performed in real time. The minimum in the local neighbourhood 1*E is obtained at the end of the chain in each clock period. Operations to be performed at the moment t0 are described in table 5.

TABLE 5

Operations to be performed at the moment t0

```
              t0 - 1  t0  t0 + 1
                   5
                   ↓
MIN1  5 8 1 6 2 4  5  8 7 1 6 8 5 3 2 1 1 3 2
                 ↘ 7
                  ↘↓
MIN2    4 5 1 6 1  4  5 2 7 1 6 1 1 3 2 1 1 3 2
                 ↘ 5
                  ↘↓
MIN3      2 2 1 1  1  4 5 2 7 1 3 1 1 3 2 1 1 3 2
                 ↘ 8
                  ↘↓
MIN4      2 2 1  1  1 4 4 2 2 1 3 1 1 3 2 1 1 3 2
                 ↘ 8
                  ↘↓
MIN5        1 2  1    1 1 4 4 2 2 1 3 1 1 3 2 1 1 2 2
```

The horizontal and vertical portions based on the minimum operation have been discussed above, which portions perform together the operation of erosion of mathematical morphology in neighbourhood W*H. A maximum operator performing dilation can also be subjected to a similar examination.

Dilation and erosion can both be performed with the same structure. The operation is reversed by changing the basic operators searching for the minimum for those searching for the maximum or vice versa.

BRIEF DESCRIPTION OF THE DRAWINGS

A filter according to the invention is described below in more detail with reference to the enclosed drawing, in which:

FIG. 1 shows the structure of a prior art filter;

FIG. 2 shows the structure of a horizontal portion of a filter according to the invention, and FIG. 3 shows the structure of a vertical portion of the filter according to the invention.

DETAILED DESCRIPTION OF THE PREFERRED EMBODIMENT

FIG. 2 shows the structure of a horizontal portion of a filter according to the invention. This horizontal portion comprises operator elements, the number of which is W and each of which consists of one comparing means min and one delay means D, the operator elements being connected one after another in such a way that the output of the delay means D of a preceding operator element is connected to the first input of the comparing means min of the following operator element. The input IH of the horizontal portion is connected to the first input of the comparing means min of the first operator element and also to the second input of the comparing means min of each operator element. Thus each operator element receives simultaneously the value coming to its input IH and the result of the operation (for instance minimum) of the preceding operator element delayed in each operator element approximately by the delay of the delay means D, i.e., in practice most usually by one clock period. The output of the horizontal portion of FIG. 2 is formed by the output MINW of the Wth operator element. This represents the minimum or maximum values searched for in the portions including W successive samples, which portions have been allowed to slide over the one after another organized horizontal lines of the basic data matrix.

FIG. 3 shows the structure of a vertical portion of a filter according to the invention. This vertical portion comprises operator elements, the number of which is H and which are similar to those in FIG. 2, the operator elements being connected one after another in such a way that the output of the delay means D of a preceding operator element is connected to the first input of the comparing means of the following operator element. The output of the Hth operator element forms the output MINH of the vertical portion. The vertical portion further comprises delay lines, the number of which is H and each of which comprises X+1 delay means D connected one after another, the input IV of the vertical portion being connected both to the first and the second input of the comparing means min of the first operator element and also to the input of the first delay line. On the other hand, the output of each delay line is connected both to the second input of the comparing means min of the following operator element and to the input of the following delay line. By means of this vertical portion, the erosion or dilation process can be applied to sets including H sample values below each other of the vertical rows of the basic data matrix or to find the minimum or maximum value of each of the sets.

A very substantial property of the filter according to the invention is the possibility of connecting horizontal and vertical portions forming the filter one after another in a desired manner. The most conventional way is to connect one horizontal portion and one vertical portion to each other, whereby the filter processes a segment of a basic data matrix. When such a filter suited for processing a rectangular segment is realized as a concrete component, such as an integrated circuit, the problem easily emerges that the sphere of influence of the circuit, i.e., the dimensions of the segments thereof are not sufficient for the application planned. As to these dimensions, however, the filter of the invention can be extended very easily by connecting filter structures capable of processing a certain segment one after another in such a way that the horizontal portions thereof and the vertical portions, respectively, are connected one after another, which provides a filter structure the dimensions of the processing neighbourhood of which are equal to the sum of the dimensions of the parts thereof. For instance, when two filters capable of processing a W×H segment are connected one after another in this way, a filter is provided the dimensions of the processing neighbourhood of which are 2W×2H. To make a connection like this possible, the circuit of FIG. 2 shows beside its input IH another input MIN and beside its output another output IHO. To make such a chaining of horizontal portions possible, it is also necessary to break the connection between the input IH of the horizontal portion and the first input of the comparing means of the first operator element, which now gets its own input MIN. On the other hand, the other output IHO relates to the line through which the other inputs of all operator elements are supplied with a respective initial value. By connecting the horizontal portion of the second filter after the horizontal portion of the first filter, the horizontal portion can be extended to continue quite like the chain shown in FIG. 2, whereby its length increases in the proportion with the number of operator elements of this increased horizontal portion.

A similar chaining can be realized also with the vertical portions shown in FIG. 3. Then the output MINH of a preceding vertical portion is connected to the input IV of the following vertical portion, and on the other hand, the output DLO of the last delay line is connected to the input DLI of the delay line of the vertical portion of the following filter. This input DLI thus connected to the input of the first delay line of the vertical portion is then naturally disconnected from the first input IV of the first operator element of the vertical portion in question.

Furthermore, it shall be noted that filters according to the invention can be connected one after another also in many other ways, e.g., in such a way that an operation of erosion is at first applied to the basic data by means of a filter according to the invention, and immediately after that, an operation of dilation by means of a similar filter, but now naturally arranged to search for maximums. Consequently, arbitrary numbers of filters according to the invention, both dilation and erosion filters, can be connected one after another in an arbitrary manner without disturbing the function of the filters. In this way, images filtered in different ways can be produced for instance in image processing, which images, say subtracted from each other, bring forward the very property searched for with special emphasis.

In the filter according to the invention, a division of the operators into separate horizontal and vertical portions in the local neighbourhood W*H decreases the number of necessary maximum/minimum operators (dilation/erosion operators) from W*H to W+H compared with the traditional structure of realization.

Further, a division of the operators into horizontal and vertical portions decreases the extent of wiring required for the realization of electronics or IC in the proportion (W+H)/(W*H) compared with the traditional solution.

The operating and realizing principle of the filter according to the invention makes a flexible modular extension from the neighbourhood 1*1 till the neighbourhood W*H possible, in which W and H are optional positive integers. A restriction is caused only by the dimensions of the basic data to be processed, so that Wsx and Hsy.

The neighbourhood W*H can easily be configured to neighbourhood $W_1*H_1$, in which $1 \leq W_1 \leq W$ and $1 \leq H_1 \leq H$. This property makes a versatile effective image segmentation for instance in image processing possible.

An advantage of the filter is its capability of eliminating unnecessary data samples whenever it is observed that they cannot be maximums (dilation) or minimums (erosion) of the neighbourhood W*H, which decreases the amount of the data to be processed. Due to this, the method is very quick, the delay is defined only by the time required for one maximum/minimum operation. The operations can be performed in real time. If, for instance, a line camera is used for producing an image, no separate extensive image memory is needed for storing the data to be processed. The filter suits especially well for image processing (pattern recognition, image segmentation) and decreases remarkably the realization costs compared with conventional solutions.

The filter of the invention has above been described by means of one exemplifying structure only and it is understandable that it could be changed to some extent without differing from the scope of protection defined by the enclosed claims, however.

We claim:

1. A filter for applying a selected one of dilation and erosion operations of mathematical morphology using a W×H rectangular structuring element to a two-dimensional matrix of discrete values, the width of the matrix being x and the height being y, said filter comprising:
   (a) a horizontal portion for applying said selected one of said dilation and erosion operations to a W×1 local neighbourhood, said horizontal portion having an input and an output and comprising W identical operator elements connected one after another, each of said operator elements comprising:
      (i) comparing means having two inputs and one output for producing the lesser or greater of the input values at said output, in the cases of said erosion and said dilation operations, respectively; and
      (ii) delay means having one input and one output, the output of said comparing means being connected to the input of said delay means and the output of the delay means being connected to the first input of the comparing means of a following one of said operator elements;
   the input of the horizontal portion being connected to the first input of the comparing means of a respective first operator element and also to the second input of the comparing means of each of said operator elements in the horizontal portion, the output of the delay means of the Wth of said operator elements forming the output of said horizontal portion, and
   (b) a vertical portion for applying said selected one of said dilation and said erosion operations to a 1×H local neighbourhood, said vertical portion having an input and an output and comprising:

H operator elements identical with said operator elements of the horizontal portion and connected one after another; and H delay lines each having an input and an output and comprising x+1 further delay means connected one after another;

the input of said vertical portion being connected to both first and second inputs of the comparing means of a respective first operator element of said vertical portion and also to the input of the first of said delay lines, the output of each delay line being connected both to the second input of the comparing means of a following one of said operator elements and to the input of the following delay line, and the output of the respective Hth operator element forming the output of said vertical portion;

said horizontal and vertical portions being connected one after the other such that the output of one of said portions is connected to the input of the other of said portions, the input of the first one of said portions forming the input of the filter to which the matrix elements are serially applied, and the output of the second one of said portions forming the output of the filter.

2. A filter for applying an operation associated with mathematical morphology using a W×H rectangular structuring element to a two-dimensional matrix of discrete values, the width of the matrix being x and the height being y, the filter comprising:

(a) a horizontal portion for applying said operation to a W×1 local neighbourhood, said horizontal portion having an input and an output and comprising W identical horizontal operating means connected one after another, each of said operating means comprising:

(i) first comparing means having two inputs for receiving respective input values and one output for producing a comparison output; and (ii) first delay means having one input and one output, the output of said first comparing means being connected to the input of said first delay means and the output of the first delay means being connected to the first input of the first comparing means of a following one of said horizontal operating means;

wherein the input of the horizontal portion is connected to a respective first input of the first comparing means of a respective first of said horizontal operating means and also to the second input of the first comparing means of each of said horizontal operating means;

wherein the output of the respective first delay means of the Wth of said operating means forms the output of said horizontal portion, and (b) a vertical portion of applying said operation to a 1×H local neighbourhood, said vertical portion having an input and an output and comprising:

H vertical operating means comprising respective second means for comparing and second means for delaying identical those associated with said horizontal operating means and connected one after another; and H delay lines each having an input and an output and comprising x+1 further delay means for delaying connected one after another;

wherein the input of said vertical portion is connected to both first and second inputs of the second comparing means of a respective first of said vertical operating means and also to the input of the first of said delay lines, wherein the output of each delay line is connected both to the second input of the second comparing means of a respective following one of said vertical operating means and to the input of the following one of said delay lines, wherein the output of the respective Hth vertical operating means forms the output of said vertical portion;

wherein said horizontal and vertical portions are connected one after the other so as to permit a respective output of one of said portions to be connected to an associated input of the other of said portions, wherein the input of the first one of said portions forms the input of the filter to which the matrix elements are serially applied, and wherein the output of the second one of said portions forms the output of the filter.

3. The filter as recited in claim 2, wherein said operation is an erosion operation and wherein said comparing means comprises comparing means for generating said comparison value representing a minimum of said two input values.

4. The filter as recited in claim 2, wherein said operation is a dilation operation and wherein said comparing means comprises comparing means for generating said comparison value representing a maximum of said two input values.

* * * * *